US008855668B2

(12) United States Patent
Olsson et al.

(10) Patent No.: US 8,855,668 B2
(45) Date of Patent: Oct. 7, 2014

(54) DEVICE SPECIFIC TRACKING AREA IDENTITY LISTS

(75) Inventors: Lars-Bertil Olsson, Angered (SE); Lasse Olsson, Stenungsund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 329 days.

(21) Appl. No.: 13/320,949

(22) PCT Filed: May 26, 2010

(86) PCT No.: PCT/EP2010/057253
§ 371 (c)(1),
(2), (4) Date: Nov. 17, 2011

(87) PCT Pub. No.: WO2010/136495
PCT Pub. Date: Dec. 2, 2010

(65) Prior Publication Data
US 2012/0071173 A1   Mar. 22, 2012

Related U.S. Application Data

(60) Provisional application No. 61/181,467, filed on May 27, 2009.

(51) Int. Cl.
  *H04W 24/00* (2009.01)
  *H04W 60/04* (2009.01)
(52) U.S. Cl.
  CPC .................................. *H04W 60/04* (2013.01)
  USPC ........ 455/456.1; 455/433; 455/436; 455/440; 455/442; 455/444; 370/331; 370/332; 370/333

(58) Field of Classification Search
  USPC ........... 455/432.1, 433, 435.1, 436, 440, 442, 455/456.1, 456.3, 457
  See application file for complete search history.

(56) References Cited

U.S. PATENT DOCUMENTS

| 2007/0198184 A1* | 8/2007 | Yoshioka et al. ............. 701/211 |
| 2008/0254814 A1* | 10/2008 | Harris et al. .................. 455/458 |
| 2009/0042575 A1* | 2/2009 | Voyer et al. .................... 455/436 |
| 2010/0029298 A1* | 2/2010 | Iwamura et al. ........... 455/456.1 |
| 2010/0113024 A1* | 5/2010 | Wu ................................ 455/436 |
| 2010/0194096 A1* | 8/2010 | Seifert et al. .................... 285/24 |
| 2010/0285816 A1* | 11/2010 | Vos et al. ................... 455/456.1 |
| 2010/0323705 A1* | 12/2010 | Iwamura et al. .............. 455/440 |

(Continued)

OTHER PUBLICATIONS

Mitsubishi Electric: "Self-optimization of assigned TA list from reported list of last visited TAs", 3GPP Draft; S2-073219, 3rd Generation Partnership Project (3GPP), Mobile Competence Centre, 650, Route Des Lucioles ; F-06921 Sophia-Antipolis Cedex, France, vol. CT WG1, no. Kobe, Japan; 20070926, Sep. 26, 2007, 5 pages, XP050026822 [retrieved on Sep. 26, 2007].

(Continued)

*Primary Examiner* — Dai A Phuong
(74) *Attorney, Agent, or Firm* — Rothwell, Figg, Ernst & Manbeck, P.C.

(57) ABSTRACT

A method and system for providing a User Equipment (UE) (101) with a Tracking Area Identity (TAI) list during a Tracking Area Update (TAU) procedure. The TAI is UE specific and is based on a visitation history (305) of the UE (101). If a pre-existing visitation history of the UE does not exist, a TAI is compiled using other UEs featuring at least one operational similarity as the current UE (101).

13 Claims, 6 Drawing Sheets

(56) References Cited

U.S. PATENT DOCUMENTS

| | | | |
|---|---|---|---|
| 2012/0135735 A1* | 5/2012 | Ponce De Leon et al. | 455/436 |
| 2014/0057630 A1* | 2/2014 | Chin et al. | 455/435.1 |
| 2014/0092871 A1* | 4/2014 | Wang et al. | 370/331 |

OTHER PUBLICATIONS

"3rd Generation Partnership Project; Technical Specification Group Core Network and Terminals; Non-Access-Stratum (NAS) protocol for Evolved Packet System (EPS); Stage 3 (Release 8)" 3GPP Standard; 3GPP TS 24.301, 3rd Generation Partnership Project (3GPP), Mobile Competence Centre, 650, Route Des Lucioles ; F-06921 Sophia-Antipolis Cedex, France, No. V1.1.1, Oct. 1, 2008, pp. 1-177, XP050365235.

Huawei: "Update the description of the ISR function for TS24.301"3GPP Draft; C1-082722 REV 082490, 3rd Generation Partnership Project (3GPP)Mobilecompetence Centre, 650, Route Des Lucioles ; F-06921 Sophia-Antipolis Cedex, France, vol. CT WG1, no. Zagreb, Croatia; 20080630, Jun. 30, 2008, 4 pages, XP050029927 [retrieved on Jun. 30, 2008].

CATT: "P-CR TR24.801: Last Visited TAI" 3GPP Draft; C1-080548, 3rd Generation Partnership Project (3GPP), Mobile ' Competence Centre, 650, Route Des 1 Lucioles ; F-06921 Sophia-Antipolis Cedex, France, vol. CT WG1, no. Puerto Vallarta, Mexico; 20080205, Feb. 5, 2008, 3 pages, XP050027882 [retrieved on Feb. 5, 2008].

Mitsubishi Electric: "Collecting mobility statistics in support of configuration and ; optimisation of LTE/SAE networks", 3GPP Draft; R3-070660 (Collecting Mobility Lstatistics), 3rd Generation Partnership ,Project (3GPP), Mobile Competence Centre, 1650, Route Des Lucioles ; F-06921 'Sophia-Antipolis Cedex, France, vol. RAN WG3, no. St. Julian's, Malta; 20070321, Mar. 21, 2007, 3 pages, XP050161559, [retrieved on Mar. 21, 2007].

Motorola: "Clarification on the registered PLMN for Network Sharing" 3GPP Draft; C1-092180, 3rd Generation Partnership Project (3GPP), Mobile 1 Competence Centre, 650, Route Des Lucioles ; F-06921 Sophia-Antipolis Cedex, France, no. Sophia Antipolis (France); 20090427, Apr. 27, 2009, 8 pages, XP050337707 [retrieved on Apr. 27, 2009].

CATT: "P-CR TR24.801, Last Visited TAI and S-TMSI" 3GPP Draft; C1 072405, 3rd Generation Partnership Project (3GPP), Mobile Competence Centre, 650, Route Des Lucioles ; F-06921 Sophia-Antipolis Cedex, France, vol. CT WG1, no. Kobe, Japan; 20071001, Oct. 1, 2007, XP050026807 [retrieved on Oct. 1, 2007].

\* cited by examiner

DEVICE SPECIFIC TRACKING AREA IDENTITY LISTS

CROSS-REFERENCE TO RELATED APPLICATIONS

This application is a 35 U.S.C. §371 National Phase Entry Application from PCT/EP2010/057253, filed May 26, 2010, and designating the United States, which claims the benefit of U.S. Application Ser. No. 61/181,467, filed May 27, 2009, the disclosure of which is incorporated by reference herein in its entirety.

TECHNICAL FIELD

Example embodiments presented herein are directed towards providing device specific Tracking Area Identity (TAI) list within mobile networks.

BACKGROUND

Mobility management is an important function in maintaining cellular networks. The goal of mobility management is to track where cellular phones, or User Equipments (UEs), are located in order for mobile phone services to be provided to the various UEs included in any given network.

Cellular networks, for example Global System for Mobile Communication (GSM) or Universal Mobile Telecommunications System (UMTS), comprise radio networks featuring a number of base stations. Each base station covers a limited geographical area. Integrating the coverage of a number of base stations provides a cellular network with radio coverage over a much wider area. In an Evolved Universal mobile Telecommunications system Terrestrial Radio Access Network (E-UTRAN), an eNodeB or a group of these base stations may be referred to as covering a Tracking Area (TA).

A Tracking Area Update (TAU) procedure allows a UE to inform the cellular network when the UE moves from one TA to another. When an UE detects it has moved to a different TA and the UE is not registered for that TA, the UE will send a TAU request to the cellular network in order to get a Tracking Area Identity (TAI) list of TAs associated with the UE's current location. The UE then becomes registered for the TAs included in the TAI List.

If TAs are very large, there will be many UEs operating simultaneously, resulting in high paging traffic, as every paging request is broadcast to every base station within the same TA. This puts a strain on the bandwidth and power of the UE by requiring the UE to listen for broadcast messages too often. In contrast, if there are a large number of small TAs, the UE must contact the cellular network frequently once the UE moves from one TA to another.

The network node typically responsible for mobility management is the Mobility Management Entity (MME). The MME is a key control node typically responsible for idle mode UE tracking, paging procedures, bearer activation/deactivation processes, and the MME is also responsible for choosing a Serving Gateway (SGW) for a particular UE. MMES typically assign a TAI list to a UE during an TAU, where the TAU is performed in an operator specific manner.

SUMMARY

Example embodiments presented herein provide improved methods of providing TAU procedures and TAI lists designed for specific UEs. Employing UE specific techniques reduces the number of TAU procedures a UE may require, particularly a mobile UE.

Example embodiments comprise a method and network node for providing a UE specific TAI list. The network node and method may store current visitation information of the specific UE in a network node, the current visitation information may be related to a last visited TA and a time of visit. The network node and method may also compile a visitation history based on the current visitation information and pre-existing visitation information. The network node and method may further evaluate the visitation history of the specific UE, and providing a TAI list including possible TAs which is likely be utilized by the specific UE based on the visitation history of the UE.

If the pre-existing visitation information is null, or does not exist, the network node and method may provide a TAI list template including a list of TAs utilized by other UEs which have been in contact with the network node. The TAI list template may include a list of frequently utilized TAs by UEs in contact with the network node.

Furthermore, if the pre-existing visitation history is null, or does not exist, the network node and method may provide a copy of a TAI list from another UE in contact with the network node, wherein the other UE may include at least one operational similarity with respect to the specific UE. The at least one operational similarity may comprise a common utilized TA and/or a time stamp value within a predetermined time window.

The storing of visitation information may further include time stamping a TAU procedure with the network node and the evaluation may further comprise truncating a TA of the TAI list based on stored time stamps. The network node and method may also provide the TAI list as a function of operational conditions.

Example embodiments may also include a telecommunications system featuring a Serving Gateway node and the network node described above.

DEFINITIONS

| | |
|---|---|
| Base Transceiver Station | (BTS) |
| Evolved Universal mobile Telecommunications system Terrestrial Radio Access Network | (E-UTRAN) |
| Global System for Mobile Communication | (GSM) |
| High Speed Serial | (HSS) |
| Internet Protocol Connectivity Access Network | (IP-CAN) |
| Mobility Management Entity | (MME) |
| Policy and Charging Enforcement Function | (PCEF) |
| Public data network Gateway | (PGW) |
| Radio Network Controller | (RNC) |
| Serving Gateway | (SGW) |
| Tracking Area | (TA) |
| Tracking Area Identity | (TAI) |
| Tracking Area Update | (TAU) |
| Universal Mobile Telecommunications System | (UMTS) |
| User Equipment | (UE) |
| Wide Area Network | (WAN) |

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments.

Figure 1:
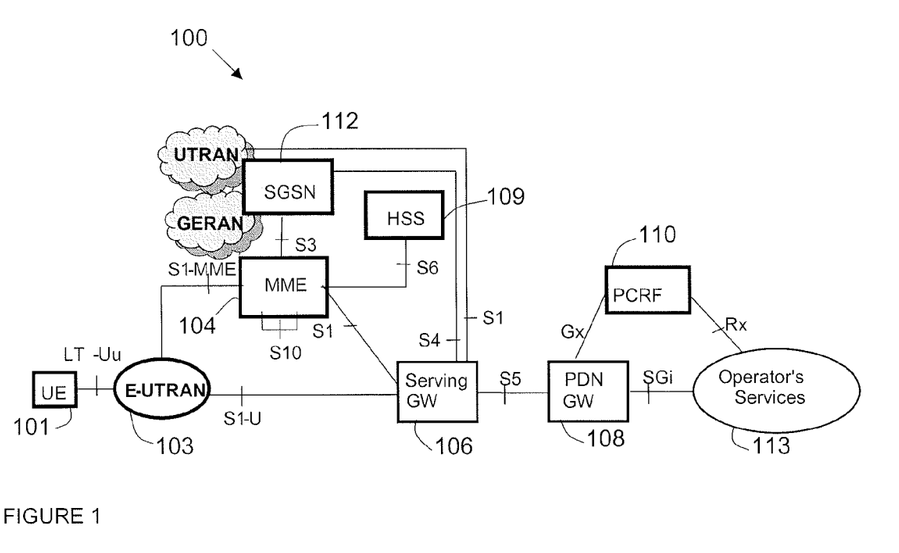
FIG. 1 is a block schematic of a mobile network.
Figure 2:
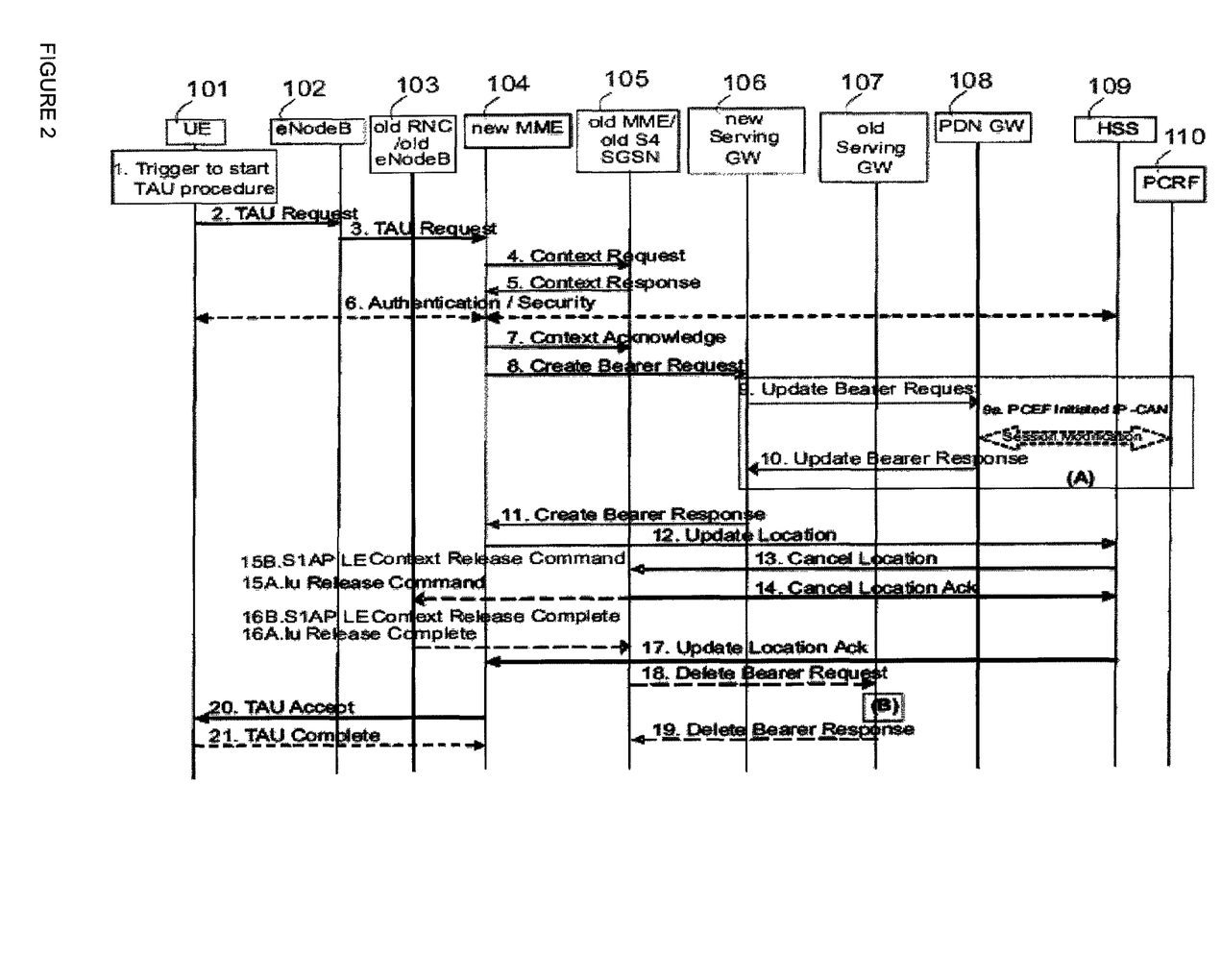
FIG. 2 is a sequence messaging diagram featuring the network nodes of FIG. 1.

FIG. 1 illustrates a block schematic of a mobile network 100 and FIG. 2 illustrates a sequence messaging diagram 200 depicting messages among the nodes of FIG. 1 which may be employed during a typical TAU procedure. Once a UE 101 enters a TA which is not included in a current TAI list of the UE 101, the UE may initiate a TAU procedure (message 1). The TAU may be initiated when the UE 101 sends a request to an eNodeB 102 within an Evolved Universal Mobile Telecommunications System Terrestrial Radio Access Network (E-UTRAN) 103 (message 2). The eNodeB 102 may be a Base Transceiver Station (BTS) configured to communicate directed with the UEs. The eNodeB 102 may forward the TAU request to a MME 104 within the new TA the UE 101 has entered (message 3). The TAU request may include information relating to the UE 101. The information may include a last TA visited by the UE 101.

Relying on the information included in the TAU request, the MME 104 associated with the new TA may send a context request to the MME associated with the TA from which the UE 101 utilized prior to entering the new and current TA which may be used to inquire as to the UE's authenticity (message 4). The old MME, or core node, 105 may in return supply a context response which may be used to verify authenticity (message 5).

Upon receiving the context response, an authentication or security connection may be established between the UE 101 and the new MME 104. Similarly an authentication or security connection may also be established between the new MME 104 and a High Speed Serial (HSS) interface 109 (message 6). The HSS 109 may be employed to create a communication link over Wide Area Networks (WANs) links. Thereafter, the new MME 104 may send a context acknowledge message to the old core node 105 acknowledging that the context response was received (message 7).

The new MME 104 may thereafter send a bearer request to a new Serving Gateway (SGW) 106 associated with the new MME 104 and TA the UE 101 is currently in (message 8). The SGW may be responsible for the delivery of data packets from and on the mobile stations within an associated geographical service area. The new SGW 106 may in return send an update bearer request message to the Public data network Gateway (PGW) 108 (message 9). The PGW may provide connectivity from the UE to external packet data networks.

Thereafter, a Policy and Charging Enforcement Function (PCEF) may initiate an Internet Protocol Connectivity Access Network (IP-CAN) session modification (message 9a). The PGW 108 may then send an update bearer response to the new SGW 107, which may in turn send a create bearer response to the new MME 104 (messages 10-11). The new MME 104 may send and update location message to the HHS 109 which may in turn send a cancel location request to the old core node 105 (messages 12-13). The old core node 105 may send a cancel location acknowledgement to the HSS 109 (message 14). For a scenario where the old core node 105 is an SGSN, the old core node 105 may send an Iu Release Command to the Radio Network Controller (RNC) 103 (message 15A), while in a scenario where the old core node 105 is an MME, the old core node 105 may also send an S1AP UE Context Release Command to the old eNodeB 10x (message 15B). The old RNC 103 or the old eNodeB may in turn send an Iu Release Complete message (message 16A) or an S1AP UE Context Release Complete message (message 16B), respectively, to the old core node 105 and the HSS 109 may send an update location acknowledgement to the new MME 104 (message 17). The old core node 105 may send a delete bearer request to the old SGW 107 and the old SGW 107 may in turn send a delete bearer response back to the old core node 105 (messages 18-19). Finally, the new MME 104 may send a TAU accept message forwarding the new TAI list and the UE 101 may send a TAU complete message acknowledging receipt of the TAI list (messages 20-21).

As shown from the above example, a number of messages are sent to various network nodes during a TAU procedure. Thus, example embodiments are provided herein to reduce the number necessary TAU procedures thereby reducing paging traffic among the network nodes. In example embodiments, the reduction of TAU procedures may be provided with the of UE specific TAI lists, in contrast to operator specific TAI lists.

A UE specific TAI list provided by the new MME 104 may be compiled in a number of ways. According to example embodiments, the new MME 104 may save a compiled TAI list of a UE as well as operational information. By storing such information a MME may accurately provide a list of past TAs and TAs which are likely to be used the an UE, thereby reducing the number of necessary TAU procedures.

Figure 3:
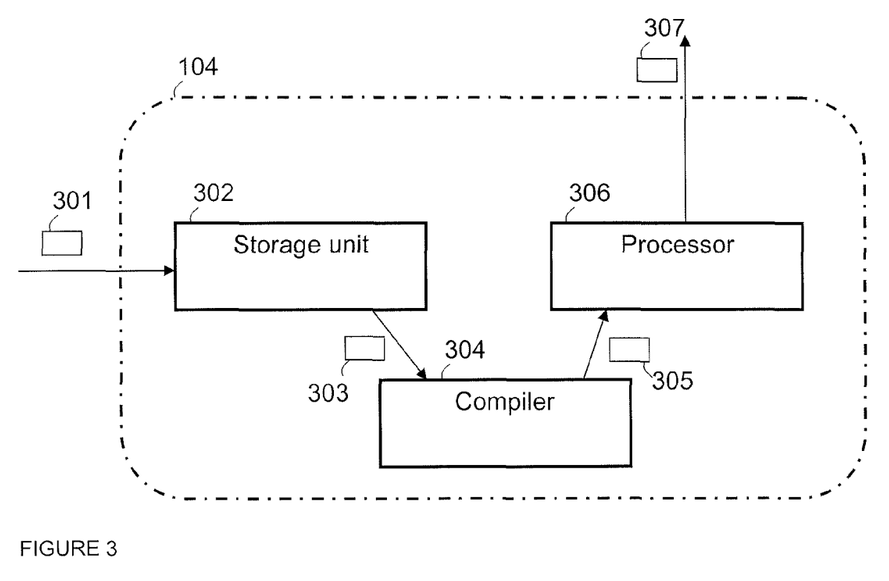
FIG. 3 is a block schematic of a MME node according to example embodiments.
Figure 4:
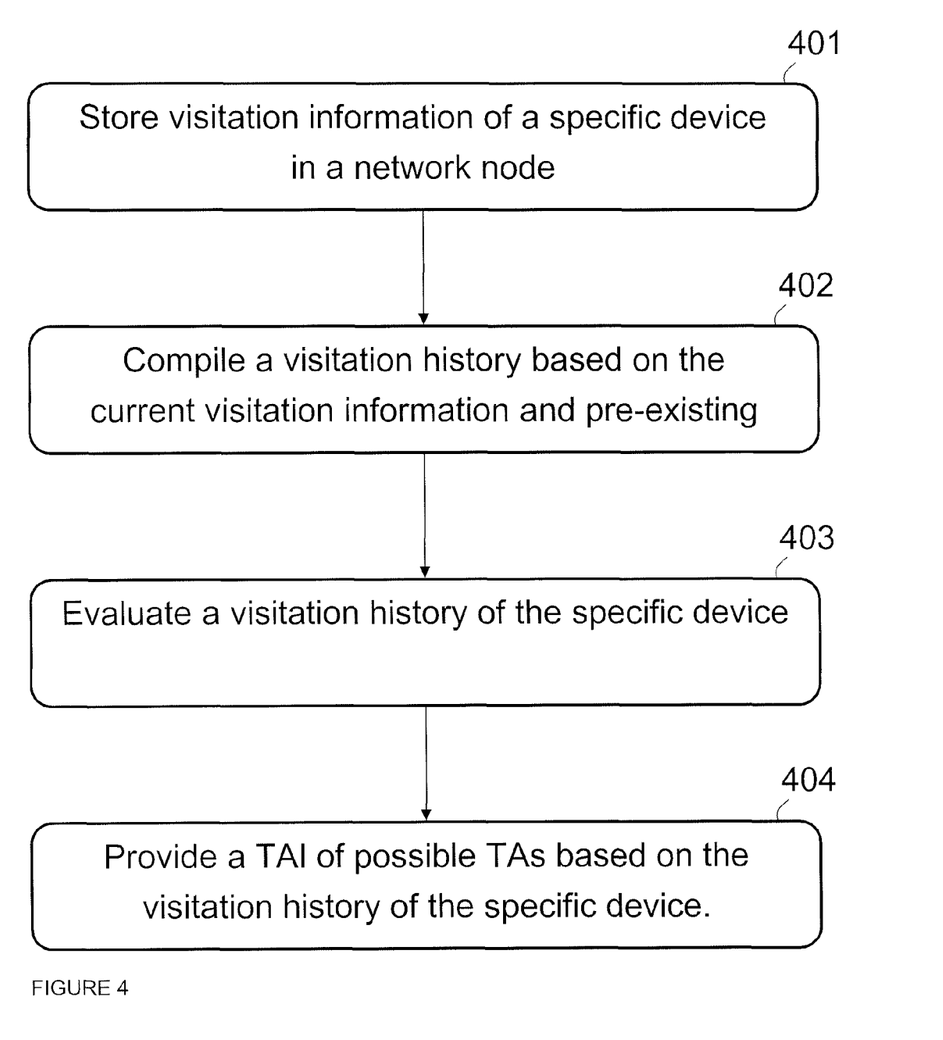
FIG. 4 is a flow diagram of operational steps of the MME of FIG. 3 according to example embodiments.

FIG. 3 illustrates an example of an MME node and FIG. 4 illustrates example operational steps that may be employed by the MME node of FIG. 3. In one example embodiment the MME node 104 may be configured to receive a TAU procedure request 301 from the UE 101. The TAU procedure request 301 may include a time stamp and an identification of the last utilized TA. This information may be stored in a storage unit 302 within the MME node 104 (401). The stored information 301, along with any pre-existing information regarding the UE 101, may be sent to a compiler 304 configured to compile a visitation history of the UE 101. The visitation history may include TAs the UE has visited in the past, the number of times each TA has been visited and/or the operating conditions of the UE during the TA visit (e.g., time or day of visit). It should be appreciated that any other operating condition or any combination of such, known in the art may also be included in the visitation history. The compiler may thereafter send the visitation history 305 to a processor 306 of the MME node 104. The processor 306 may evaluate the visitation history and provide a TAI list 307 of TAs which the UE may likely visit (403, 404).

In some instances the MME node 104 may not have a visitation history regarding a specific UE 101, or the visitation history may be null. According to example embodiments, if the visitation history is null, the processor 306 may provide a TAI list in the form of a template. The template may include most frequently visited TAs utilized by UEs associated with the MME providing the TAU procedure. The template may also be constructed based on operational conditions. For example, a template may be constructed for UEs which show high mobility during day time hours. Such a template may be utilized by user's who perform a daily commute to work, where the TAs in such a template may include TAs situated in common commuter paths. It should be appreciated that the template may be provided utilizing any parameters known in the art which may indicate repetitive behavior.

Figure 5:
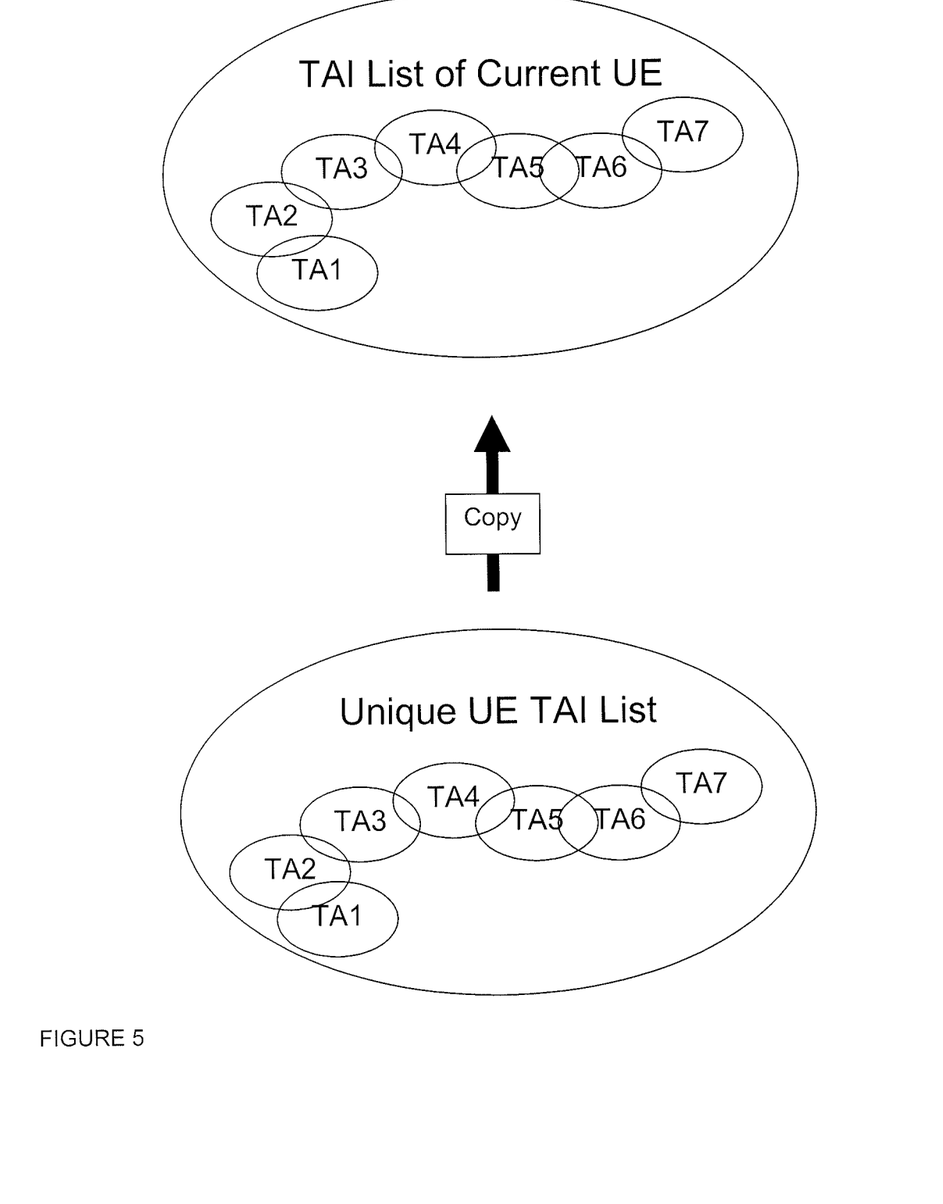
FIGS. 5, 6A, and 6B are illustrations of TAU procedures according to example embodiments.

In other example embodiments, when the visitation history is null, the processor 306 may be configured to copy the TAI list of another UE, which may be stored within the MME node 104, that has been in contact with the MME node 104, as shown in FIG. 5. In deciding which UE to copy from, the MME node 104 may choose a UE which has at least one operational similarity as the current UE 101. Examples of operational similarities may include UEs which have been in contact with MME node 104 within a predetermined time window (e.g., all UEs which have been in contact within an hour of the current UE 101 may be a candidate for TAI list copying). It should be appreciated that any time window may be employed and that such a time window may be adjusted. Another example of an operational similarity may be a last visited TA. Therefore, if another UE has a same last visited TA or if the last visited TA of the current UE is included in the TAI list of another UE, the UE may be chosen for TAI list copying. Once the UE has been chosen, the unique TAI list of the chosen UE (illustrated on the bottom of FIG. 5) may be copied from the information stored in the MME to a TAI list of the current UE 101 (illustrated on the top of FIG. 5). It should be appreciated that the copying may take place within the memory or storage unit of the MME node 104 as well as the current UE 101.

In other example embodiments the MME 104 may be configured to manage a UE specific TAI list for highly mobile UEs. For highly mobile UEs, the TAI list may be configured to include a predetermined number of TAs at any one given time. Once a TA is introduced into the TAI list which exceeds the predetermined number, a number of methods may be employed to truncate a listed TA. For example, all the TAs in the TAI list may be time stamped, such that once the UE re-enters the TA a new time stamp is provided for that TA. In this instance, the decision on which TA to truncate may be based on which TA has the longest dated time stamp. Furthermore, if a TA is determined to be a frequently visited TA, the frequently visited TA may be fixed within the TAI list and therefore unable to be truncated.

Figure 6A:
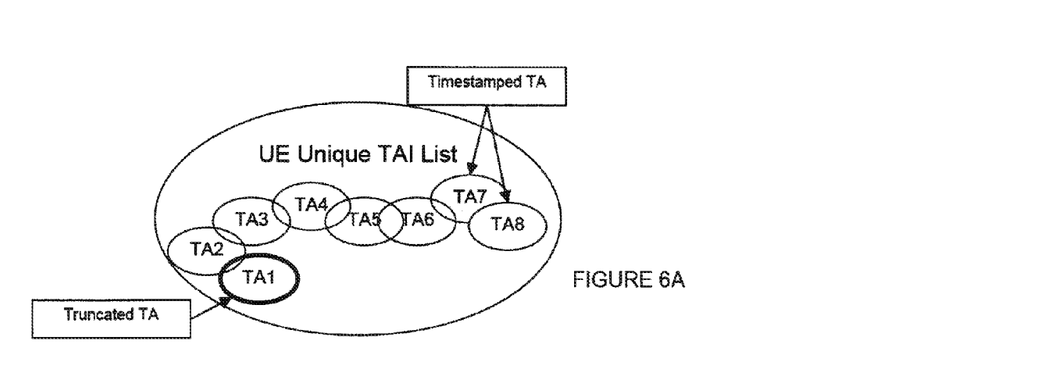
Figure 6B:
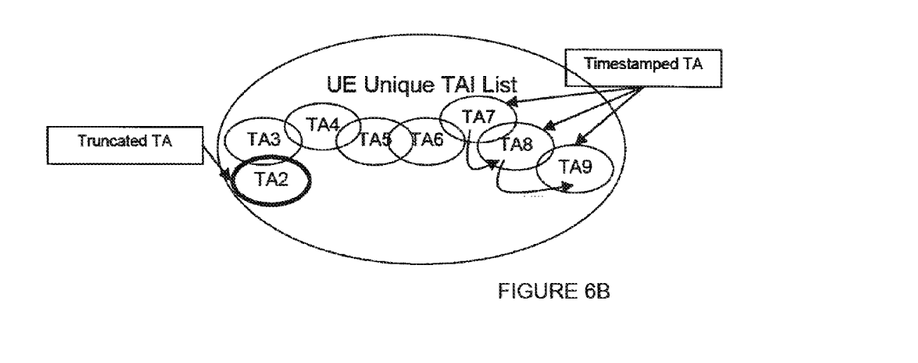

It should be appreciated that any other means of selection may be utilized, for example a first in first out means for choosing a truncated TA, as illustrated in FIGS. 6A and 6B. The TAI list of FIG. 6A has eight TAs labeled TA1 to TA8. TA1 is highlighted as the TA to be truncated should an additional TA be added to the TAI list (via a first in first out means of selection). As another TA, TA9, is added to the TAI list TA1 is truncated and TA2 is highlighted as being the next TA to be truncated, as shown in FIG. 6B. It should further be appreciated that a last in first out means for choosing a truncated TA may also be used. Furthermore, it should also be appreciated that the manner of selecting a truncated TA may be based on an operational condition (e.g., TAs used during day time hours may be placed at a lower priority for truncating than TAs used during night time hours).

It should further be appreciated the MME may be configured to refresh any time stamp information when a UE has transitioned from an idle state to a connected state. Thus, during a service request, the MME may update any saved time stamp information. Therefore, the MME may maintain accurate information regarding the movement of the UE.

The foregoing description of embodiments of the present invention, have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

The invention claimed is:

1. A method of providing a User Equipment, UE, specific Tracking Area Identity, TAI, list, the method comprising:
   storing current visitation information of the specific UE in a network node, the current visitation information being related to a last visited Tracking Area (TA) and a time of visit, wherein the TA is a group of base stations;
   compiling a visitation history based on the current visitation information and pre-existing visitation information;
   evaluating the visitation history of the specific UE; and
   providing from said network node to said UE a TAI list including a possible TA which is likely be utilized by the specific UE based on the visitation history of the UE, wherein
   the step of providing further comprises: determining that the pre-existing visitation information is null; and in response to determining that the pre-existing visitation information is null, providing a TAI list template including a list of TAs utilized by other UEs which have been in contact with the network node, and
   the TAI list template includes a list of frequently utilized TAs by UEs in contact with the network node.

2. The method of claim 1, wherein the step of providing further comprising:
   determining that the pre-existing visitation information is null; and
   in response to determining that the pre-existing visitation history is null, providing a copy of a TAI list from another UE in contact with the network node, wherein said other UE includes at least one operational similarity with respect to the specific UE.

3. The method of claim 2, wherein the at least one operational similarity comprises a common utilized TA and/or a time stamp value within a predetermined time window.

4. The method of claim 1, wherein the step of storing visitation information further includes time stamping a TA update procedure with the network node and the step of evaluating further comprises truncating a TA of the TAI list based on stored time stamps.

5. The method of claim 1, further comprising refreshing time stamp information in the network node during a service request by the UE.

6. The method of claim 1, wherein said visitation information comprises one or more of:
- one or more TAs that said UE has visited in the past;
- the number of times each TA has been visited; and
- the operating conditions of the UE during the TA visit.

7. A network node for providing a Tracking Area Identity, TAI, list, the node being configured to:
- store current visitation information of a specific User Equipment, UE, in the network node, the current visitation information being related to a last visited Tracing Area, TA, and a time of visit, wherein said TA is a group of base stations;
- compile a visitation history based on the current visitation information and pre-existing visitation information; and
- evaluate the visitation history of the specific UE, the node further configured to provide from said network node to said UE a TAI list including a possible TA which is likely to be visited by the specific UE based on the visitation history of the UE, wherein
- if the pre-existing visitation history is null, the node is configured to provide a TAI list template including a list of TAs utilized by other UEs which have been in contact with the network node, and
- the node is further configured to provide the template based on frequently utilized TAs by UEs in contact with the network node.

8. The node of claim 7, wherein if the pre-existing visitation history is null, the node is configured to provide a copy of a TAI list from an other UE in contact with the network node, wherein said other UE includes at least one operational similarity with respect to the specific UE.

9. The node of claim 8, wherein the at least one operational similarity includes a common utilized TA and/or a time stamp value within a predetermined time window.

10. The node of claim 7, wherein the node is further configured to store a time stamp of a TA update procedure with the network node and the node is further configured to truncate a TA of the TAI list based on stored time stamps.

11. The node of claim 7, wherein the node is further configured to refresh time stamp information during a service request by the UE.

12. A telecommunications system featuring a User Equipment and the network node of claim 7.

13. The network node of claim 7, wherein said visitation information comprises one or more of:
- one or more TAs that said UE has visited in the past;
- the number of times each TA has been visited; and
- the operating conditions of the UE during the TA visit.

* * * * *